United States Patent
Hamlin (10) Patent No.: US 6,795,849 B1
(45) Date of Patent: Sep. 21, 2004

(54) PARADIGM FOR INTER-NETWORKED STORAGE

(75) Inventor: Christopher L. Hamlin, Los Gatos, CA (US)

(73) Assignee: LSI Logic Corporation, Milpitas, CA (US)

( * ) Notice: Subject to any disclaimer, the term of this patent is extended or adjusted under 35 U.S.C. 154(b) by 735 days.

(21) Appl. No.: 09/842,335

(22) Filed: Apr. 25, 2001

(51) Int. Cl.[7] ............................................. G06F 15/167
(52) U.S. Cl. ...................... 709/213; 709/217; 709/239
(58) Field of Search ................................. 713/400, 600; 710/15, 17, 36, 38, 105, 316; 709/212–218, 224, 230–232, 238–239, 243

(56) References Cited

U.S. PATENT DOCUMENTS

| | | | | |
|---|---|---|---|---|
| 4,100,403 A | * | 7/1978 | Eggenberger et al. | 714/765 |
| 6,658,478 B1 | * | 12/2003 | Singhal et al. | 709/232 |
| 6,697,914 B1 | * | 2/2004 | Hospodor et al. | 711/112 |
| 2001/0044879 A1 | * | 11/2001 | Moulton et al. | 711/114 |
| 2002/0107971 A1 | * | 8/2002 | Bailey et al. | 709/231 |
| 2002/0172195 A1 | * | 11/2002 | Pekkala et al. | 370/360 |

* cited by examiner

Primary Examiner—Dennis M. Butler
(74) Attorney, Agent, or Firm—Suiter West PC LLC (57) ABSTRACT

An architecture is described having characteristics, scale and realized according to a minimized cost function with the ability to control and govern liability, availability, band width, capacity and quality of service as one pleases subject to a desired type of management software or framework.

38 Claims, 3 Drawing Sheets

PARADIGM FOR INTER-NETWORKED STORAGE

FIELD OF THE INVENTION

The present invention generally relates to the field of the storage and retrieval of electronic data, and particularly to a paradigm for inter-networked storage.

BACKGROUND OF THE INVENTION

The efficient and persistent storage and retrieval of electronic data is one of the most important considerations in the modern economy. With the advent of E-commerce and applications utilized by enterprises to perform most every function of the business, a vast quantity of data is generated that must be stored in a persistent manner to ensure data integrity. Further, this data must be available to the enterprise to enable the efficient operation of the enterprise. Losses of data and data availability may cripple an enterprise, resulting in great economic and social loss.

With the growth of E-commerce enterprises and the increasing reliance on electronic data in everyday life, there is an ever-increasing need for being able to affiliate larger pools of storage with the Internet than are currently practiced. The attributes of scalability, such as an ability to grow any desired attribute, such as capacity, bandwidth, liability, availability of service, quality of service, or any combination of those things, as rapidly as desired by a consumer, with a cost that is, preferably, linear than the attribute of interest is not a characteristic of current storage solutions today. The industry has found what may be a limiting factor to the efficient growth of an enterprise, such as E-Commerce companies and the like, is that enterprises are encountering superlinear growth cost functions associated with the scaling characteristics. Thus, there is a need to grow storage with an acceptable cost function, or as low a cost function as possible, with any degree of rapidity and/or scale desired.

Moreover, there are a variety of digital transmission services that are beginning to be deployed now, such as digital TV, digital audio, digital transmission of streaming data on the Internet, and the like, that may utilize isochronous traffic. Isochronous is a term used to refer to real time digital data moving through a system where every item of data is clocked and occurs at a precise clock edge, so that temporal coherence is achieved. This is a large transition from the old asynchronous computer view of time. Thus, there is a need to synchronize and deploy cost-effective isochronous transports from satellite, terrestrial, fiber optic, wireless, terrestrial wireless and so on. Additionally, the infrastructure required for enabling the various providers to behave coherently and interactively so that human beings may access content, push channels, pause, resume, fast forward, fast reverse, and so on and so forth, may require an infrastructure change from the current Internet.

Therefore, it would be desirable to provide an inter-networked storage paradigm.

SUMMARY OF THE INVENTION

Accordingly, the present invention is directed to an inter-networked storage paradigm. Preferably, to accomplish governable costs of ownership and other cost constraints, the total cost of ownership should remain consistent. Therefore, the architecture, according to storage growth, should lend itself to automated management, such as automated management, algorithms and methodologies, and the like.

The present invention provides an architecture that brings together disparate technical elements to achieve inter-networked storage. Further, the present invention has the desirable characteristics, scale, may be realized according to a minimized cost function with the ability to control and govern the liability, availability, bandwidth, capacity and quality of storage as one pleases subject to some kind of management software or framework.

In a first aspect of the present invention, an apparatus includes a controller, a hybrid switching element suitable for interpreting network data received from a networking device and storage data received from a storage device. A protocol accelerator is also included suitable for utilizing a data storage addressing scheme. Additionally, an error control component is provided suitable for compensating for loss of at least one of a network element and a data storage element. The error control component is communicatively coupled to the hybrid switching element, protocol accelerator and controller so as to enable error control coding including network and data storage.

In a second aspect of the present invention, a storage and network processor includes a storage controller and a network input interface suitable for coupling to a network to provide a network connection. A storage device input/output interface is also provided for coupling to a storage device. A hybrid switching element is included for interpreting network data received from a networking device and storage data received from a storage device. A protocol accelerator suitable for utilizing a data storage addressing scheme is included. An error control component suitable for compensating for loss of at least one of a network element and a data storage element is also provided. The error control component is communicatively coupled to the hybrid switching element, protocol accelerator and storage controller so as to enable error control coding suitable for describing a data storage element and a network element accessible to the SAN processor.

In a third aspect of the present invention, a method of acquiring data includes receiving a request for storage data, the storage data available on a first storage device. The storage data on the first storage device is determined to be unavailable by a hybrid switching element, the unavailability of the storage data caused by at least one of a network failure and a storage device failure. A path is delineated for obtaining the storage data, wherein determining a communication pathway and redundant data address delineates the path. The data is acquired based on the delineated path.

In a fourth aspect of the present invention, a SAN processor suitable for providing inter-network storage disposed between a storage device and a network includes means for controlling storage and means for interfacing with a network, the network interfacing means suitable for coupling to a network to provide a network connection. Means for interfacing with a storage device, the storage device interfacing means suitable for coupling to a storage device is also provided. Further, means for hybrid switching, the hybrid switching means suitable for interpreting network data received from a networking device and storage data received from a storage device is also included. Means for accelerating a protocol, the protocol accelerator means is suitable for utilizing a data storage addressing scheme. Means for controlling errors, the error control means is suitable for compensating for loss of at least one of a network element and a data storage element. The error control means is communicatively coupled to the hybrid switching means, protocol accelerator means and storage controller means so as to enable error control coding including at least two of communication links, switches, data storage and processors accessible to the SAN processor.

In a fifth aspect of the present invention, an inter-networked storage system, includes a network suitable for transmitting electronic data, a first node communicatively coupled to the network and a second node communicatively coupled to the network. The first node and the second node include a storage device suitable for storing electronic data and a storage/network processor coupled to the storage device. The storage/network processor includes a hybrid switching element suitable for interpreting network data received from a networking device and storage data received from a storage device. The storage/network processor also includes an addressing component suitable for addressing data in a format suitable for storage across the network and an error control component suitable for compensating for loss of at least one of a network element and a data storage element. Error control coding is provided suitable for describing network error data and data storage error data to enable the error control components to provide inter-networked storage over the first node and the second node.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
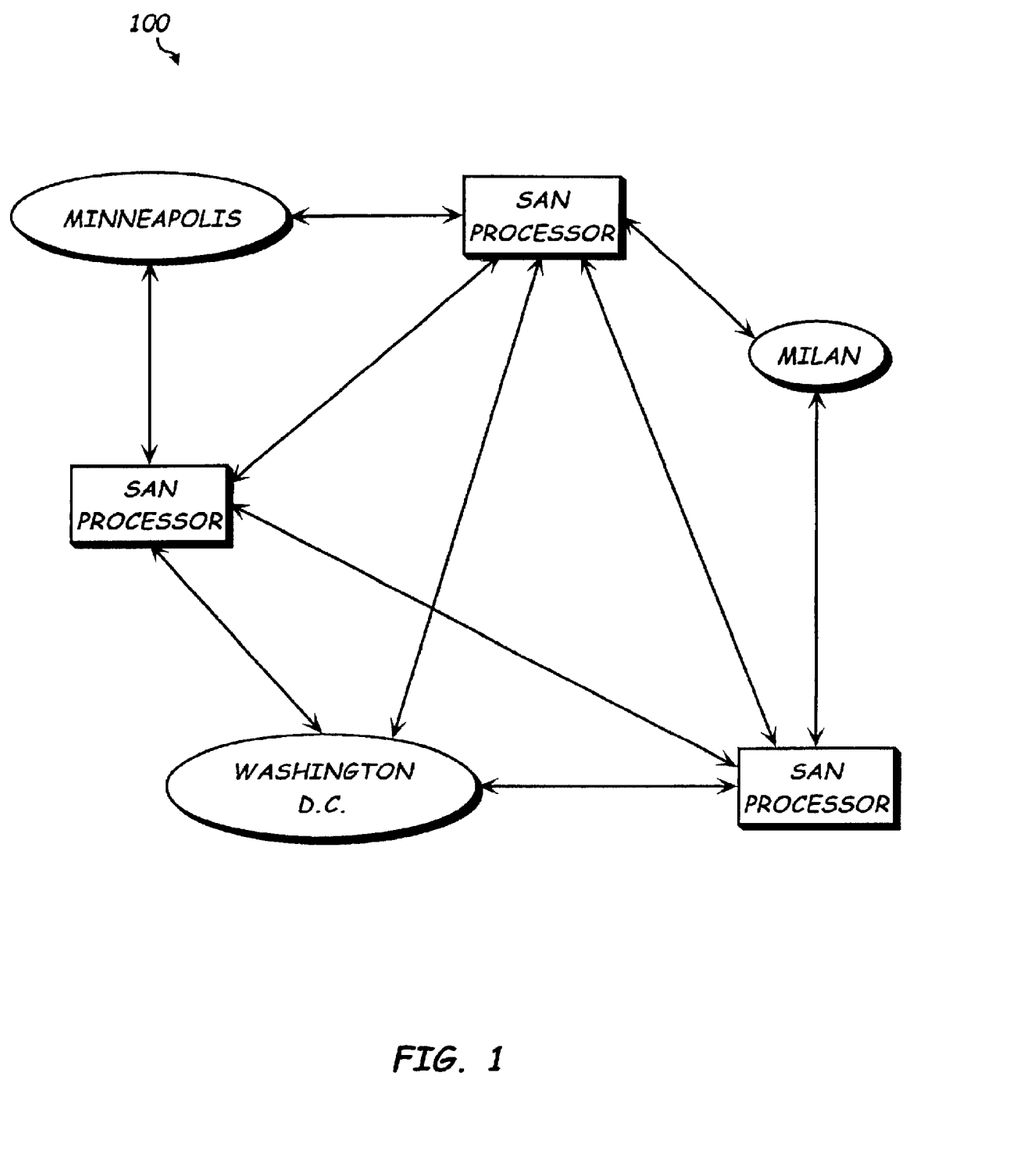
FIG. 1 is an illustration of an exemplary embodiment of the present invention wherein distributed Internet storage is shown.
Figure 2:
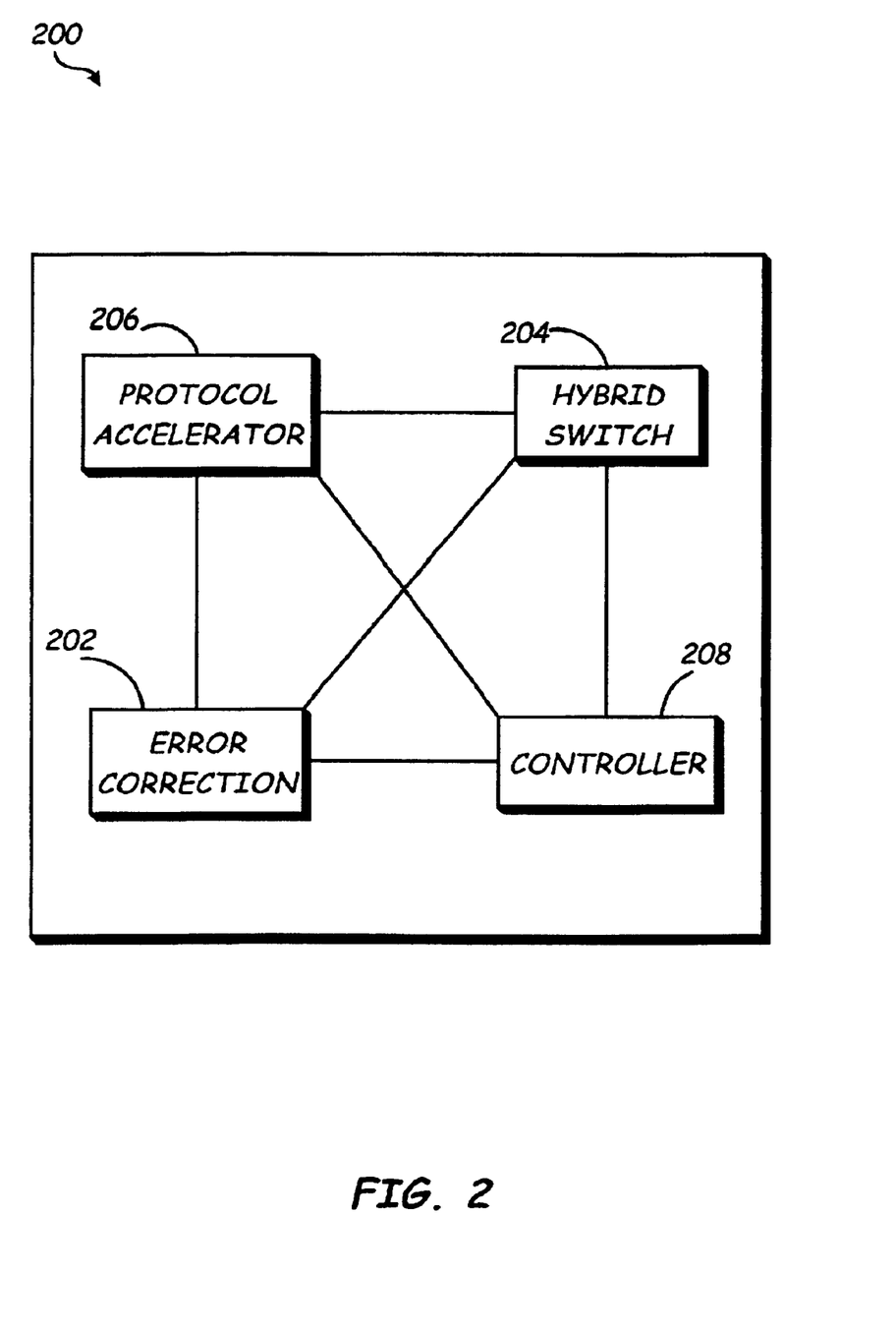
FIG. 2 is a block diagram depicting an exemplary embodiment of the present invention wherein a device unifies and integrates four functions to accomplish incorporation of storage within a networked paradigm.
Figure 3:
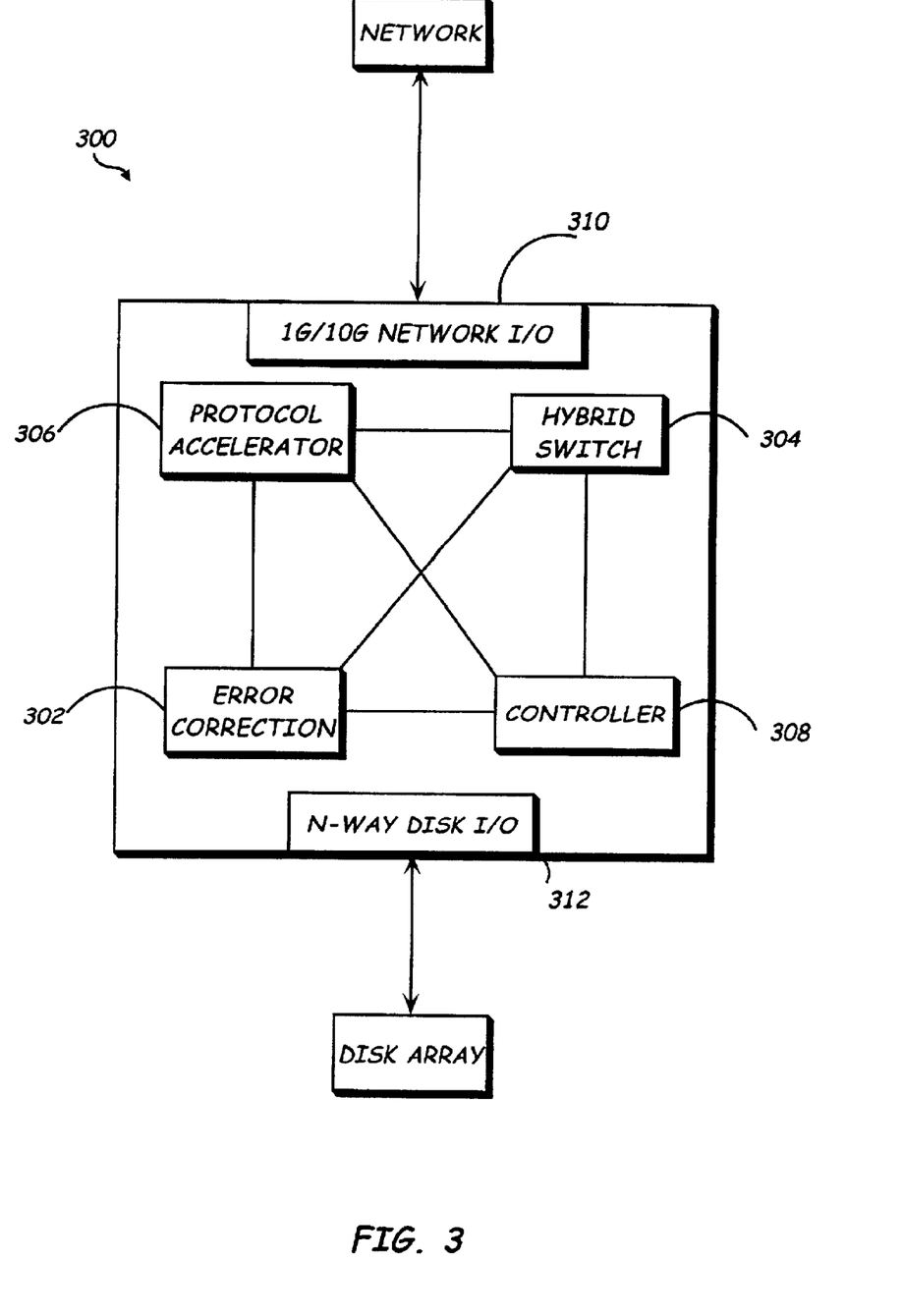
FIG. 3 is a block diagram illustrating an exemplary embodiment of the present invention wherein a device that integrates functions to accomplish incorporation of storage within a networked paradigm as a SAN processor is shown.

Referring generally now to FIGS. 1 through 3, exemplary embodiments of the present invention are shown. An architecture is described to bring together essentially four disparate technical elements so that it has the desirable characteristics, scale and is realized according to a minimized cost function with the ability to control and govern liability, availability, band width, capacity and quality of storage as one pleases subject to a desired type of management software or framework. The present invention describes an enabling technology to be able to create a management software framework that provides an automated flexible storage system and may also provide a variety of functions, such as error control management, fabric management services, data synchronization and allocation services, hybrid switching, and the like.

Referring now to FIG. 1, an exemplary embodiment 100 of the present invention is shown wherein distributed Internet storage is shown. The present invention provides an interconnection network wherein nodes may be reached even if some set of components in the network is malfunctioning. The paradigm includes transport elements that unify nodes and routing and switching elements at the nodes, and also the associated storage components. In this way, an architecture is provided for in which a packet switch protocol and addressing technology functionality includes electronic elements, such as storage elements, that may be implicated in an inter-networked collection of objects.

Referring now to FIG. 2, an exemplary embodiment 200 of the present invention is shown wherein a device unifies and integrates four functions to accomplish incorporation of storage within a networked paradigm. Four functional elements are provided in an architectural interaction with mutual dependency to accomplish the functional objectives of the present invention.

Four functions which may be utilized to incorporate storage within a network paradigm may include (1) an error control component 202, (2) a switching element, such as a hybrid 204, (3) a protocol accelerator 206, and (4) a controller 208. An error control component 202, may include a variety of different mechanisms without departing from the spirit and scope of the present invention, and will be further described later. A switching element is included, which may be referred to as a hybrid 204 due to the ability to understand traffic of different kinds depending on whether the traffic is stemming from a storage device, from networking devices and any combination and mixture of the storage and networking devices and the like.

A protocol accelerator 206 is also included, which may have the ability to increase throughput of an addressing protocol, such as an IPv6 Internet protocol, and the like. Thus, the protocol accelerator 206 may increase a variety of functions, and in particular to extract, filter and/or modify on the fly addressing components that are of interest as a function of the track records coming through. The protocol accelerator 206 may help in providing bandwidth suitable for performing types of functions contemplated by the present invention.

A controller 208 may also be included, such as disk array controller hardware. The controller 208, error control component 202, hybrid 204, and protocol accelerator 206 may all be implemented as hardware. For example, an integrated circuit may be provided that incorporates these functional elements with communications between them. It may be preferable to implement communication between the function units with Lightning Data Transport (LDT), HyperTransport, and the like, such as even more aggressive interconnect methodologies which are contemplated by the present invention without departing from the spirit and scope thereof.

In an exemplary embodiment of the present invention, an addressing capability is incorporated into an internetworking protocol, such as IPv6, and utilizes a 128-bit address base of IPv6 to generalize a block space according to which data is represented on the storage devices. For instance, if a user desired to assign a separate address to every bite on the Internet, it may be achieved by utilizing a 128-bit address. By utilizing the present invention, a user has the capability of encapsulating any desired collection of data items under a uniform address space, which may then be manipulated and treated to support a desired attribute. For instance, desirable attributes may include reliability, availability, bandwidth, quality of service, administrative, and the like, and/or combinations of these attributes taken together under a management framework.

The present invention may be implemented as a piece of hardware including a number of microprocessors implementing control functions within it. Error control coding, which may be implemented in the error control component 202, is capable of compensating for the loss of any type of the associated elements. For example, failure of a node, such as San Francisco, New York or Milan as shown in FIG. 1, instances of a storage processor based on devices of the kind, and the like, may be compensated by an error control unit of the present invention.

Therefore, the present invention enables failure of any element, whether it be the communications link in the sense of packet switched Internet, or it might be a disk drive in one of the nodes that failed, a router that failed, and the like. This architecture is such that because of the existence of the collection of functions at each processing point, it is, in principle and provably, possible to find a collection of devices and associated data redundancy. In other words, a collection of devices and encoded data may be found on the network even in the event of failure of a variety of the devices. Additionally, another powerful aspect of the present invention is that knowledge of the location of the data elements is not necessary and the data elements may be distributed across vast geographical distances yet still operate utilizing the present invention.

For example, data elements may be distributed, i.e. not in the same place. Once identified, the present invention has the ability to adaptively delineate a path to those necessary and sufficient elements such that a data nexus is provided. The nexus can be reconstituted even in the face of failure of an element. For instance, in a contemplated implementation, for discussion purposes, N=2, which is defined so that robustness characteristics of this architecture put together in devices of this kind is such that a loss of any pair of functional units may occur yet still provide operational functionality. The functional units may be the same and may also include different types of functional units, such as from one link and one storage device, two storage devices, or two links. Even in the event of failure, the present invention provides a complete collection of elements necessary to reconstitute the structure, not only of the communication pathways, but also of the data itself.

A code may be chosen for implementation by the present invention to provide data redundancy. For example, a Patel code may be used in the relationship of storage devices. The use of Patel code tolerates the loss of two of a collection of functional elements, including a disk drive assembly. Further, the code is such that it will invariably allow the reconstruction of the complete set of the data even in the face of the loss of two out of N. The value of N may vary greatly, with N typically greater than three, and in practice N is 8, 10 or some larger number.

Although a Patel code is described, a variety of other codes are contemplated by the present invention. A code may be developed so that it is specifically suited for applications contemplated by the present invention. Additionally, codes of this kind need not only be applied to the loss of the storage device itself, particularly, if a distributed architecture was used in which redundant bits are used. In other words, full repetition is not necessary, which may be inefficient and inconsistent with scaling objectives and cost functions. The number of bits of redundancy that are needed to incorporate is a function of the type of code, which may be as low as 10 percent or less under certain conditions. Thus, the code used may be determined based on the desired scope of coverage incorporated in the system.

Additionally, the redundancy elements may be distributed as partial distributions as a function of the mean time between failure (MTBF) characteristics of the devices that are covered. For example, it may be noted that the MTBF of a router, switch, storage device, transmission link, interconnect module, and the like has a certain value. Therefore, data may be distributed utilizing the present invention so that the MTBF is accounted for, such as including greater redundancy on lower MTBF devices, and the like.

Because the present invention may look at the elements as a distributed environment, it offers a greater degree of freedom in terms of how redundancy is allocated. That, in turn, may be made a fully automated function of the control software because the control software may inventory and understand all of the working elements of its architecture and make allocations that are consistent with a desired policy.

In enterprise systems on this scale, which may include terabytes, petabytes and even greater quantity client systems, the actual management of the infrastructure may be accomplished according to policy scripts. Policy is generally derived and/or written directly from policy manuals of an enterprise, and then realized and implemented in terms of codes that are generated from the policy imaging. The present invention provides a platform to enable alteration of policy characteristics by a user. For example policy characteristics may include quality of service, acceptable risk in the form of availability and reliability, performance and potential performance degradation in the face of storage system loss, but not data loss, in the face of loss of infrastructure elements, and quality of service guarantees that are offered to various users of the system. One of ordinary skill in the art will be familiar with methods for allocating elements of its architecture to be able to honor these policy considerations by utilizing the elements of the present invention.

For example, a chip may be provided having a large margin of safety as to storage data. The chip may be "tweaked" without having to redesign it to encompass a larger network as well as risk considerations. For instance, a first user may not need 100 percent data availability guaranteed, while a second super-conservative user may desire and even require such a guarantee. A variety of chip versions may be provided to meet these needs. For instance, a variety of characteristics may be provided and selected by a user, just like checking off a box. The characteristics may include a network input, which might be anywhere from one to dozens and beyond, that feed the switch element could be varied, both with respect to their bandwidth and with respect to the number of ports. The number of disk interfaces could also be varied, which, in turn, has an impact on the scale of the switching element and its associated memories, because the memories associated with the switching element, which may then have an impact on the value area. All of the characteristics may be varied parametrically, as a function of the desired use of the invention.

Additionally, the present invention may be configured so that the fundamental functional elements are essentially fixed and optimized. For example, protocol acceleration may be optimized to perform under most contemplated implementations. The error control code may also be optimized, although it may be capable of being varied as desired. The switching element may also be optimized and the array controller is also optimized. Further, the functional elements may also be recombined in different numbers and different performance levels and associated with different rates. Thus, a wide scaling range may be provided, as the device may be configured for implementations ranging from home to large enterprise situations. For instance, the present invention may be configured so that a core set of components are scaled from a consumer grid home networking installation, where cost may be extremely important, but where performance of a certain kind is also desirable. The present invention may also be scaled to the other end of the scale where large-scale enterprises, distributing enterprises, and storage systems are provided.

Further, as an increasing number of enterprises become dependent on 24/7 E-Commerce and/or access to data and the like, more and more of these enterprises require off-site disaster recovery facilities and/or backup facilities. By utilizing the present invention, the requirement for utilizing tape may be diminished if not removed completely. For example, if a consumer had a petabyte under active management in storage, it may take a significant period of time to perform a data backup. Thus, the use of linear media may not be effective in performing this operation. Instead, by utilizing the present invention, a redundancy may be provided. For instance, a combination of redundancy and bandwidth may be provided for data persistency even in the case of structural and device disaster situations, with the consumer ending up with, at worst, degraded performance until complete operational capabilities are restored. From a logistics point of view, it may have a variety of advantages due to the locatability of the functional elements, such as locating certain elements where costs are the cheapest, safest, and the like.

The present invention may also take advantage of the advent of dark fiber, i.e. optical fiber. The amount of optical fiber has increased dramatically, both in the United States and around the world, offering a tremendous amount of capacity. The use of optical fiber by the present invention, and the resultant high bandwidth, such as 1 gigabits per second and up, such as OC192, which may provide approximately 10 gigabits per second, and OC768, which may provide approximately 40 gigabits per second by services linking major areas, may enable a user to deploy the present invention in the service of keeping a storage repository and infrastructure accessible.

Referring now to FIG. 3, an exemplary embodiment of the present invention is shown wherein a device which integrates functions to accomplish incorporation of storage within a networked paradigm as a storage area network (SAN) processor is shown. Four functions which may be utilized to incorporate storage within a network paradigm are included with the SAN processor 300 (1) an error control component 302 capable of functioning as multi-way error correction, (2) a hybrid switch 304, (3) a protocol accelerator 306, and (4) a disk array controller 308. It may be preferable to implement communication between the function units utilizing LDT, although other even more aggressive interconnect methodology is contemplated by the present invention. The SAN processor may be communicatively coupled between a network, such as a 1G/10G Network I/O 310, and a storage device, such as an N-Way disk I/O 312.

By unifying the switching, error control and controller functional elements in one device, error control coding may be extended over all failure points automatically, such as communication links, switches, disk, processors, and the like. Further, the elements need not be local, because of unified addressing, such as IPv6 and Ipv4, which may be realized over high-speed transports. By providing tight integration of switching, addressing and error control hardware, a new protocol is enabled embracing all functional elements with respect to risk /performance tradeoffs. Thus, management and policy software may be provided to effect tradeoffs of risk, performance, quality of service, distance/locality and cost via the protocol.

Thus, a joint, unique combination of elements integrated and combined uniquely on a single device is provided. A device is provided with error control and incorporates switches that are hybrids with respect to networking traffic and a storage system, such as a disk drive. Fabric management services may be provided by utilizing the present invention as software running in association with these control processors that would have responsibility for inventorying all attached entities and understanding the operation of the switching fabric.

For example, a hypothetical case may be constructed utilizing the present invention. A request for service is received and a plurality of disk drives is included in a storage device. The data resides on some subset of drives, but it is determined that one of the drives has malfunctioned. Additionally, it happens to be a drive that contains redundancy information necessary to complete the content of the others. The switch immediately determines that having encountered this, under the control fabric management services, the device has to go out and retrieve another copy of the redundancy information, such as from Milan in FIG. 1, which has been routed there previously. Thus, data synchronization services are provided. The call goes out to Milan, the data comes back, and now through the error control mechanism, the data is restored, restored data is written out in a local cache, and the data is then returned to the requester.

It may be preferable to have data rates of 622 Mbs of data, one Gbs rates, and even greater to reduce latency associated with these operations. Typically, the cost function may be greater for shipping data a greater distance, not invariably, but typically. However, by distributing data the likelihood of keeping the data accessible may be increased, due to environmental disasters and the like.

There are several aspects of an error control function of the present invention. The error control function may be accomplished as hardware for speed and throughput. Additionally, an FPGA implementation of a Patel code-type function may be utilized. There may also be a pyramid of software for error control management for set-up which may also govern the relationship within the error control facility, on one hand, and the switch and the protocol accelerator on the other. The protocol accelerator may provide the addresses of the implicated data items.

The utilization of Patel codes or some other code in error control may not effect protocol accelerators per se. Protocol accelerators may be implemented as a programmable facility. Additionally, a Latin square may be used for driving much more powerful control planes. Latin squares are mathematical structures and matrixes that have unusual mathematical properties, which may be used for constructing codes and the like. For example, Latin Squares may be used with the address portion of the protocol. In assigning array elements to memory devices in parallel computation, it is preferable that array elements that are to be retrieved at the same time be stored in different memory units, permitting parallel access. The attempt to retrieve two array elements from the same device simultaneously may result in a memory conflict. When the number of symbols is n, and the skewing scheme is conflict-free for rows and columns, the scheme is a Latin square. Further discussion of this idea may be found in *The CRC Handbook of Combinatorial Designs* by Colbourn and Dinitz, at page 109, the entire text of the Handbook is hereby incorporated by reference in its entirety.

Described in FIG. 3 are one gigabit per second and ten gigabit per second Ethernet connections. It should be apparent to a person of ordinary skill in the art that a wide variety of protocols are contemplated by the present invention. For instance SCSI over IP, which utilize Ethernet and Internet protocols for transport storage combined with the control information along with the data packets over low cost transport elements. Thus, the present architecture is also directed at taking advantage of these protocols.

A simulation vehicle may also be utilized to show the advantageous aspects of the present invention. For example, two typical Intel PCs with disk drives in each and with an Ethernet link communicatively coupling the two over a network may be utilized. A large portion of the disks may be configured as a virtual disk. A computer program is written and supplied, which implements the ECC, the IP protocol, the Internet protocol, and the Ethernet transport and packetization. At this point, from a functional point of view, everything is provided but the switch. A switch simulation is then provided, for providing hybrid-switching functionality. So effectively, a simulation is provided of a set of distributed data centers and elements running on real hardware. Therefore, a combination of software simulation and real hardware will allow the consequences of failure modes of various kinds to be viewed.

Thus, the present invention provides a variety of functions, such as error control management, fabric management services, data synchronization and allocation services, hybrid switching, and the like.

The present invention may also provide a cure to a previously unsolved problem of isochronous traffic. Isochronous is a term used to refer to real time digital data moving through a system where every item of data is clocked and occurs at a precise clock edge, so that temporal coherence is guaranteed. There are a variety of digital transmission services that are beginning to be deployed now, such as digital TV, digital audio digital transmission of streaming data on the Internet, and the like. This is a large transition from the old asynchronous computer view of time, which is a radically different view of time than the isochronous view of time that's coming at us in the form of media. This means that the industry has an enormous amount of work to do in figuring out how to synchronize and deploy cost-effective isochronous transports from satellite, terrestrial, fiber optic, wireless, terrestrial wireless and so on to comply with FCC mandates for provision of digital content. Additionally, the infrastructure required for enabling the various providers to behave coherently and interactively so that human beings may access content, push channels, pause, resume, fast forward, fast reverse, and so on and so forth, would require an infrastructure change from the current Internet. However, an architecture of the present invention may be applied to that problem, without having to be reinvented or reconfigured, that naturally lends itself to support high bandwidth, scalable isochronous traffic.

For example, asynchronous transfer mode (ATM), in spite of its name, is, in fact, a protocol which supports isochronous traffic and is widely deployed. The problem is that ATM is quite expensive, and it is considered to be complex in its realization, although it has been successful in the enterprise and it has been successful in wide area networking applications. However, although it has been successful, it is cumbersome, complex, and its software demands are so intensive and the complexity of the interfaces is so great that it is costed out of being able to become a universal medium for the Internet and for digital TV.

By utilizing the present invention, a hybrid switch may be provided suitable for transferring data isochronously both to the storage and to the network interfaces, and at the same time. Thus, what is referred to as "Internet 2" may also be supported by the present invention. Internet 2 is currently a consortium of approximately 180 universities and colleges plus approximately 60 corporations that are generating a next generation infrastructure that may support this kind of isochronous quality of service, which currently is being based on OC3 and OC12 lengths, and which may be expanded to OC48 and OC 192 and beyond. Thus, the present invention may be provided to support isochronous service and therefor support a wide range of standards and functionality.

Additionally, it may also be desirable to support serial ATA, which is a low cost, high performance interconnect standard for disk drives, which may be a high volume, widely disseminated interconnect choice for mass storage devices. This architecture may make it unnecessary in many instances to buy much more expensive, high-end enterprise oriented disk drives for storage devices to get equivalent functionality. Thus, by exploiting the advent of serial ATA costs may be lowered.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the paradigm for inter-networked storage of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An apparatus, comprising:
    a controller;
    a hybrid switching element suitable for interpreting network data received from a networking device and storage data received from a storage device;
    a protocol accelerator suitable for utilizing a data storage addressing scheme; and
    an error control component suitable for compensating for loss of at least one of a network element and a data storage element;
    wherein the error control component is communicatively coupled to the hybrid switching element, protocol accelerator and controller so as to enable error control coding including network and data storage.

2. The apparatus as described in claim 1, wherein data is addressed utilizing a 128 bit addressing scheme.

3. The apparatus as described in claim 2, wherein the addressing scheme is at least one of IPv6 and IPv4.

4. The apparatus as described in claim 1, wherein error coding of a network includes a network element.

5. The apparatus as described in claim 4, wherein the network element includes at least one of a communication link, switch, router, transmission link and interconnect module.

6. The apparatus as described in claim 1, wherein error coding of data storage includes a data storage element.

7. The apparatus as described in claim 6, wherein the data storage element includes at least one of a storage device and a disk array.

8. The apparatus as described in claim 1, wherein the protocol accelerator is suitable for increasing throughput of at least one of IPv6 and IPv4 Internet protocols.

9. The apparatus as described in claim 1, wherein error control provided by the error control component is extended over failure points of a network, the failure points including at least one of communication link, switch, router, transmission link, interconnect module, storage device and processor.

10. The apparatus as described in claim 9, wherein the network includes at least one of Internet, Internet 2 and isochronous data transfer network.

11. A storage area network (SAN) processor suitable for providing inter-network storage disposed between a storage device and a network, comprising:
   a storage controller;
   a network input/output interface suitable for coupling to a network to provide a network connection;
   a storage device input/output interface suitable for coupling to a storage device;
   a hybrid switching element suitable for interpreting network data received from a networking device and storage data received from a storage device;
   a protocol accelerator suitable for utilizing a data storage addressing scheme; and
   an error control component suitable for compensating for loss of at least one of a network element and a data storage element;
   wherein the error control component is communicatively coupled to the hybrid switching element, protocol accelerator and storage controller so as to enable error control coding suitable for describing a data storage element and a network element accessible to the storage area network (SAN) processor.

12. The storage area network (SAN) processor as described in claim 11, wherein data is addressed utilizing a 128 bit addressing scheme.

13. The storage area network (SAN) processor as described in claim 12, wherein the addressing scheme is Ipv6.

14. The storage area network (SAN) processor as described in claim 11, wherein the network element includes at least one of a communication link, switch, router, transmission link and interconnect module.

15. The storage area network (SAN) processor as described in claim 11, wherein the data storage element includes at least one of a storage device and a disk array.

16. The storage area network (SAN) processor as described in claim 11, wherein the protocol accelerator is suitable for increasing throughput of at least one of IPv6 and IPv4 Internet protocols.

17. The storage area network (SAN) processor as described in claim 11, wherein error control provided by the error control component is extended over failure points of a network, the failure points including at least one of communication link, switch, router, transmission link, interconnect module, storage device and processor.

18. The storage area network (SAN) processor as described in claim 17, wherein the network includes at least one of Internet, Internet 2 and isochronous data transfer network.

19. A method of acquiring data, comprising:
   receiving a request for storage data, the storage data available on a first storage device;
   determining the storage data on the first storage device is unavailable by a hybrid switching element, the unavailability of the storage data caused by at least one of a network failure and a storage device failure;
   delineating a path for obtaining the storage data, wherein the path is delineated by determining a communication pathway and redundant data address; and
   acquiring data based on the delineated path.

20. The method as described in claim 19, wherein determining includes utilizing error control coding.

21. A storage area network (SAN) processor suitable for providing inter-network storage disposed between a storage device and a network, comprising:
   means for controlling storage;
   means for interfacing with a network, the network interfacing means suitable for coupling to a network to provide a network connection;
   means for interfacing with a storage device, the storage device interfacing means suitable for coupling to a storage device;
   means for hybrid switching, the hybrid switching means suitable for interpreting network data received from a networking device and storage data received from a storage device;
   means for accelerating a protocol, the protocol accelerator means suitable for utilizing a data storage addressing scheme; and
   means for controlling errors, the error control means suitable for compensating for loss of at least one of a network element and a data storage element;
   wherein the error control means is communicatively coupled to the hybrid switching means, protocol accelerator means and storage controller means so as to enable error control coding including at least two of communication links, switches, data storage and processors accessible to the SAN processor.

22. The storage area network (SAN) processor as described in claim 21, wherein data is addressed utilizing a 128 bit addressing scheme.

23. The storage area network (SAN) processor as described in claim 22, wherein the addressing scheme is at least one of IPv6 and IPv4.

24. The storage area network (SAN) processor as described in claim 21, wherein the network element includes at least one of a communication link, switch, router, transmission link and interconnect module.

25. The storage area network (SAN) processor as described in claim 21, wherein the data storage element includes at least one of a storage device and a disk array.

26. The storage area network (SAN) processor as described in claim 21, wherein the protocol accelerator is suitable for increasing throughput of at least one of IPv6 and IPv4 Internet protocols.

27. The storage area network (SAN) processor as described in claim 21, wherein error control provided by the error control component is extended over failure points of a network, the failure points including at least one of communication link, switch, router, transmission link, interconnect module, storage device and processor.

28. The storage area network (SAN) processor as described in claim 27, wherein the network includes at least one of Internet, Internet 2 and isochronous data transfer network.

29. An inter-networked storage system, comprising:
a network suitable for transmitting electronic data;
a first node communicatively coupled to the network, the first node including
  a storage device suitable for storing electronic data; and
  a storage/network processor coupled to the storage device, the storage/network processor including
    a hybrid switching element suitable for interpreting network data received from a networking device and storage data received from a storage device;
    an addressing component suitable for addressing data in a format suitable for storage across the network; and
    an error control component suitable for compensating for loss of at least one of a network element and a data storage element; and
a second node communicatively coupled to the first node over the network, the second node including
  a storage device suitable for storing electronic data; and
  a storage/network processor coupled to the storage device, the storage/network processor including
    a hybrid switching element suitable for interpreting network data received from a networking device and storage data received from a storage device;
    an addressing component suitable for addressing data in a format suitable for storage across the network; and
    an error control component suitable for compensating for loss of at least one of a network element and a data storage element
wherein error control coding is provided suitable for describing network error data and data storage error data to enable the error control components to provide inter-networked storage over the first node and the second node.

30. The inter-networked storage system as described in claim 29, wherein the inter-networked storage includes data distributed over a plurality of nodes utilizing a 128 bit addressing scheme.

31. The inter-networked storage system as described in claim 30, wherein the addressing scheme is at least one of IPv6 and IPv4.

32. The inter-networked storage system as described in claim 29, wherein error coding of a network includes a network element.

33. The inter-networked storage system as described in claim 32, wherein the network element includes at least one of a communication link, switch, router, transmission link and interconnect module.

34. The inter-networked storage system as described in claim 29, wherein error coding of data storage includes a data storage element.

35. The inter-networked storage system as described in claim 34, wherein the data storage element includes at least one of a storage device and a disk array.

36. The inter-networked storage system as described in claim 29, wherein the protocol accelerator is suitable for increasing throughput of Ipv6 Internet protocol.

37. The inter-networked storage system as described in claim 29, wherein error control provided by the error control component is extended over failure points of a network, the failure points including at least one of communication link, switch, router, transmission link, interconnect module, storage device and processor.

38. The inter-networked storage system as described in claim 37, wherein the network includes at least one of Internet, Internet 2 and isochronous data transfer network.

* * * * *